Nov. 6, 1962   R. A. BROWN   3,062,990
PROTECTIVE ELECTRICAL SYSTEMS
Filed April 10, 1961
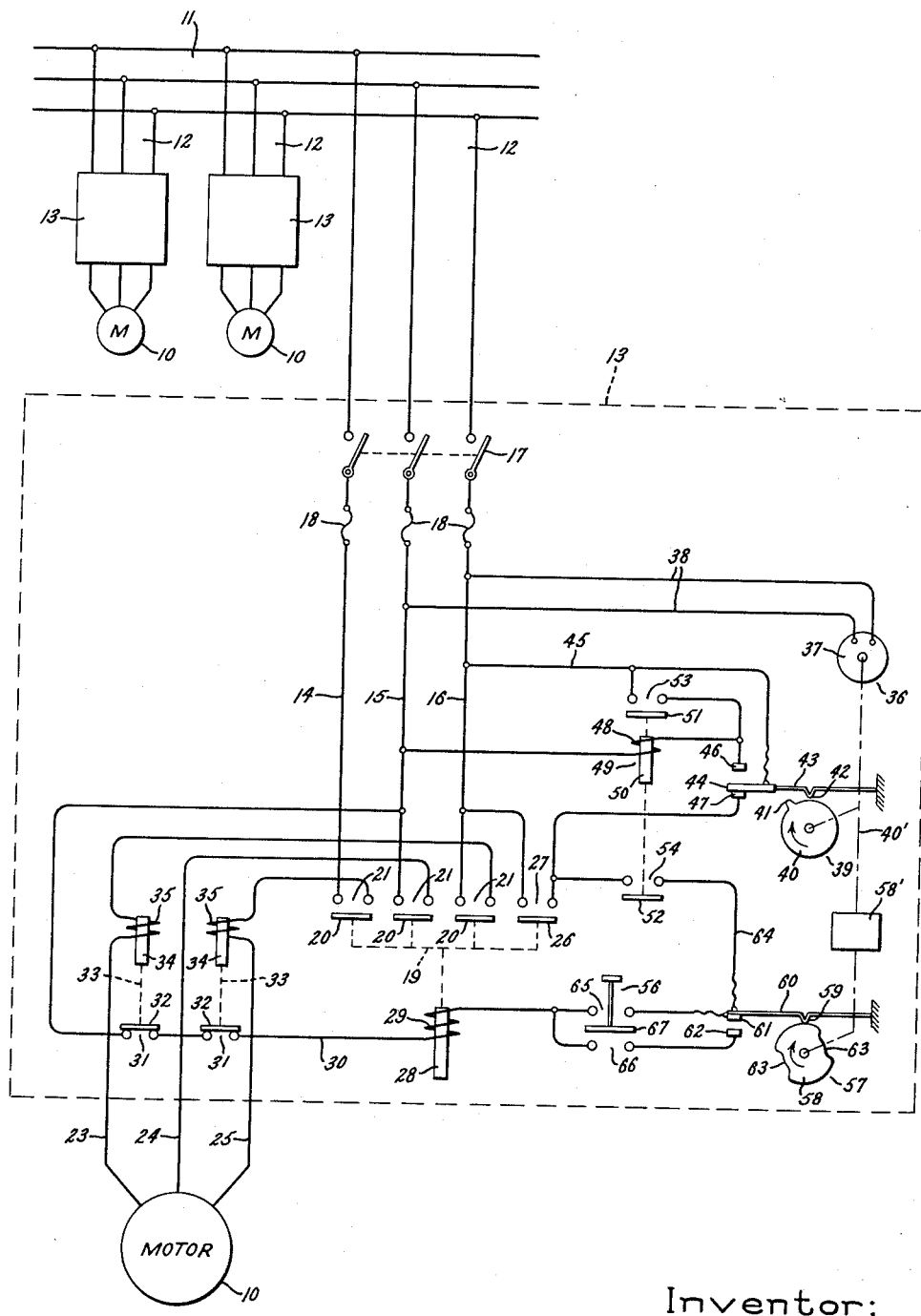
Inventor:
Russell A. Brown,
by Irving H. Marshman
Attorney.

United States Patent Office 3,062,990
Patented Nov. 6, 1962

3,062,990
PROTECTIVE ELECTRICAL SYSTEMS
Russell A. Brown, Bloomington, Ill., assignor to General Electric Company, a corporation of New York
Filed Apr. 10, 1961, Ser. No. 101,854
11 Claims. (Cl. 317—23)

This invention relates to protective electrical systems for energizing electromagnetic switching devices such as magnetic contactors and, in particular, to motor starter systems for protectively energizing a plurality of motors from a common power source, such as in oil field pumping installations where a plurality of motors are energized during the starting or restoration of pumping.

In one well known system, an electromagnetic switching device, such as a magnetic contactor, includes principal contacts in circuit with a load device, such as a motor, and also holding contacts in parallel with a timing switch which is connected in series with the contactor energizing coil. This series connection is across a voltage source and the timer is arranged so that the timing switch is closed periodically for brief intervals of time. Closure of the timing switch applies voltage from the source across the contactor coil, and if such voltage is above a certain level, the contactor picks up to energize the motor. The circuit of the contactor coil is maintained through the holding contacts after the timing switch is opened. If, however, an undervoltage condition prevails, such "undervoltage" is applied to the contactor coil only momentarily by the timing switch so that the possibility of damage to the coil or contactor is slight.

The above-described system is disclosed in United States Patent No. 2,864,049, and has proved to be very satisfactory in providing undervoltage protection. With such arrangement, however, the possibility exists that the contactor will repeatedly pick up and drop out during the interval that the timing switch is closed. This so-called contactor "pumping" action may result in damage to the contactor or coil, and could occur if the line voltage sags below the contactor drop out point for some reason while the timing switch is closed. If this happens, the contactor drops out, and as a result, the line voltage is relieved of the motor load which causes the line voltage to rise. If the timing switch is still closed at this time, the contactor coil picks up and if a voltage sag recurs, the contactor will again drop out. This contactor "pumping" or recycling will continue as long as the timing switch is closed and voltage sags recur.

Accordingly, an important object of the present invention is the provision of an improved control system for energizing a load device through an electromagnetic switching device so as to afford undervoltage protection for the switching device and to eliminate the possibility of repeated pick up and drop out of the switching device during the energization thereof.

A further object of the invention is the provision of an improved system for controlling energization of an electric load contactor including means for periodically and momentarily testing for an undervoltage condition of the system and for preventing "pumping" of the contactor by disabling the contactor until normal voltage conditions exist.

Still another object of the invention is the provision of a system as defined in the preceding object wherein the contactor is energized under the control of a program switch having a long on-off cycle compared to the undervoltage test cycle.

In general, the system includes undervoltage responsive means which is periodically and momentarily energized to test for an undervoltage condition and which is operated to allow completion of an energizing circuit for the contactor only so long as normal voltage conditions prevail. In carrying out the invention in one preferred embodiment there is provided a switching device or contactor to be protected which is energized under the control of timing means, such as a periodic time switch, and also under the control of undervoltage responsive control means in the form of a holding relay which is controlled by the timing means. The timing means includes a normally open switch connected in series with the coil of the relay which includes two sets of normally open contacts, one of which is in a sealing circuit for the relay coil and the other of which is in series circuit with the contactor coil. The timing means also includes a normally closed switch in series with the contactor coil, and the arrangement is such that the normally open and normally closed timing switches are periodically actuated to closed and open conditions respectively for brief intervals.

More specifically, the normally closed timing switch in the contactor coil circuit is opened initially and is followed by closure of the normally open timing switch in the relay coil circuit. The relay coil is thereby energized resulting in closure of the relay sealing contacts and the relay contacts in the contactor coil circuit. Since closure of the normally open timing switch in the relay coil circuit is subsequent to opening of the normally closed timing switch in the contactor coil circuit, energization of the contactor coil is prevented at this time and no contactor "pumping" can occur. The timer is arranged so that after a brief interval, the two switches are returned to their normal conditions whereby the normally open switch is opened in the relay coil circuit, and the normally closed switch is closed to complete the contactor coil circuit and effect energization of the contactor coil. If normal line voltage conditions exist at this time, the contactor picks up and the motor is energized. However, if the line voltage sags to the drop out level of the relay, the relay drops out and the two normally open relay contacts revert to their open conditions to interrupt both the relay sealing circuit and the contactor coil circuit. This deenergizes the motor and such condition will prevail until the timing switches are again actuated.

A further aspect of the invention involves the provision of a program switch for controlling energization of the contactor coil circuit in accordance with an on-off cycle which is long compared to the on-off cycle of the timing switch.

Further objects and advantages of the invention will become apparent from the following description taken in conjunction with the accompanying drawing in which the single figure is a schematic circuit diagram of the control system of the present invention.

Referring now to the drawing, there is schematically illustrated in the single figure a control system embodying the invention and shown in connection with a plurality of motors 10 each energized from a common three phase electric power source 11. Each of the motors 10 is connected for energization from the source 11 through a separate branch circuit 12 and a separate control circuit 13. One of the circuits 13 is shown as enclosed in the broken line rectangle and will be described in detail hereinafter.

Each branch circuit 12 is comprised of phase conductors 14, 15 and 16 which include contacts of a conventional line switch 17 and line fuses 18. Each motor 10 is energized under the control of a separate motor contractor 19 each of which includes three movable principal contacts 20 adapted to engage fixed contacts 21 to connect the circuit 12 to the motor through conductors 23, 24 and 25. The contactor 19 also includes an auxiliary contact 26 which is movable with the contacts 20 relative to fixed contacts 27 contained in a control circuit described hereinafter. The movable contacts 20 and 26 are operatively connected to a magnetic armature 28 surrounded by a coil 29 one end of which is connected to the conductor 15 through a conductor 30 and through fixed contacts 31 which cooperate with movable contacts 32 of a pair of overload relays 33. The relays 33 may assume various forms, such as thermal relays, and are illustrated in the form of electromagnetic relays with the movable contacts 32 connected to magnetic armatures 34 surrounded by coils 35 which are connected to the conductors 23 and 25.

The contactors 19 of the several circuits 13 are each energized under the control of a separate control means illustrated in the form of a timing device 36 of any suitable construction which includes a timing motor 37 connected through conductors 38 to the conductors 15 and 16 of the circuit 12. With such connections the motor 37 is energized whenever power is applied to the circuit 12. The device 36 includes a timing switch 39 comprised of a rotatable cam 40 which is rotated at a predetermined fixed speed by the motor 37 through a suitable driving connection designated by the dashed line 40'. The cam 40 includes a projection 41 extending from its periphery adapted to periodically engage a projection 42 of a resilient contact carrier 43 which carries a contact 44. The contact 44 is connected through a conductor 45 to the conductor 16, and is movable between a pair of fixed contacts 46 and 47 in response to flexure of the carrier 43 resulting from rotation of the cam 40. The cam 40 is geared for rotation at the rate of one revolution every few minutes, and the projections 41 and 42 will be engaged for a brief interval, such as a few seconds.

In the present invention energization of each of the contactors is also controlled by undervoltage responsive control means illustrated in the form of an electromagnetic relay 49 which is in turn controlled by the timing device 36. For this purpose the coil 48 of relay 49 is connected across the phase conductors 15 and 16 in a circuit including the contacts 44 and 46 of the timing switch. The fixed contact 46 is engaged by the contact 44 in response to flexure of the carrier 43 upwardly resulting from engagement of the projections 41 and 42. The relay 49 includes a magnetic armature 50 which carries a pair of contacts 51 and 52 arranged to engage respectively fixed contacts 53 and 54 in response to upward movement of core 50 resulting from energization of the coil 48. The normally open contacts 53 are in series with the coil 48, and this series circuit is connected across the phase conductors 15 and 16 to form a sealing circuit for the coil 48. The normally open contacts 54 of the relay 49 are included in a series circuit connected across the phase conductors 15 and 16 which also includes conductors 30, coil 29, a manually operable control switch 56 referred to more fully hereinafter, normally closed contacts 44—47 and conductor 45.

If desired, each timing device 36 may also include a program switch 57 for further controlling energization of the associated contactors 19. The switch 57 may be of any suitable construction such, for example, as that shown and described in the aforementioned Patent 2,864,049. The switch 57 is arranged to be opened and closed at selected times for predetermined intervals, and such times and intervals may be adjusted to give a desired operating cycle for each motor. The switch 57 is diagrammatically illustrated as including a cam 58 which is rotated by the motor 37 through a reduction gear train diagrammatically represented by the box 58' at a predetermined speed such, for example, as one revolution per day. The periphery of cam 58 engages a projection 59 of a resilient contact carrier 60 which carries a contact 61 movable relative to a fixed contact 62.

In the illustrated embodiment, the cam 58 is recessed at diametrically opposed areas as indicated by the reference numerals 63, and when the cam 58 has rotated to bring one of the recessed areas 63 beneath the projection 59, the carrier 60 will be moved downwardly to carry the contact 61 into engagement with the contact 62. The contact 61 is connected to the normally open contacts 54 of relay 49 through a conductor 64, and to fixed contacts 65 of the switch 56. With the arrangement shown, the intervals during which contacts 60 and 61 are engaged are substantially equal to intervals during which such contacts are disengaged. Also, such intervals are long compared to the relatively short intervals during which contacts 44—47 and 44—46 are open and closed.

The switch 56 includes two sets of fixed contacts 65 and 66, and has three operating conditions effective respectively to close the contacts 65, close the contacts 66, and close neither of the contacts 65 and 66. To this end the switch 56 includes a movable contact 67 which may be manually actuated to a first position wherein it engages the contacts 65, a second position wherein it engages contacts 66, and a third position wherein it is intermediate the contacts 65 and 66.

When switch 56 is operated to close contacts 65, the program switch 57 is effectively disconnected from the circuit and energization of the coil 29 cannot be controlled thereby. When contacts 66 and 67 are in engagement, the program switch 57 is connected in the circuit and affords a controlling function. When the switch 56 is operated to position contact 67 intermediate contacts 65 and 66 as shown, the control circuit is rendered inoperative and the coil 29 cannot be enrgized.

The operation of the control system may now be described. Let it be assumed that initially the contacts 65 and 67 of each switch 56 are in engagement, which renders program switches 57 ineffective to control energization of relay coils 29. Let it also be assumed that power has just been applied to the circuit 11 and that the switch 17 is closed so that the conductors 14, 15 and 16 of each circuit 12 are energized. For these conditions, then the motor 37 of each timer is energized and the cams 40 are rotating at preselected speeds. It is appreciated that the cams 40 of the several control systems 13 operate their associated switches at random, and therefore it is unlikely that more than one of the contactors will be energized at any given instant after the application of power. When the projection 41 is out of engagement with the projection 42, the contacts 44 and 47 are in engagement, and the contacts 44 and 46 are out of engagement as illustrated in the drawing. As a result, the energizing circuits for the coil 48 of relay 49 and for the coil 29 of contactor 19 are interrupted.

When the cam 40 has rotated to a position wherein the projection 41 engages projection 42, the carrier 43 is flexed upwardly to first move contact 44 out of engagement with contact 47 and then into engagement with contact 46. When contacts 44 and 47 are disengaged, the energizing circuit for coil 29 cannot be energized. When contacts 44 and 46 engage, the coil 48 of relay 49 is energized through a circuit which may be traced from phase conductor 15 through coil 48, closed contacts 44—46 and conductor 45 to phase conductor 16. If an "undervoltage" condition exists at this time, relay 49 will not pick up and, as will presently appear, this prevents pick up of contactor 19 when projections 41 and 42 become disengaged.

When coil 48 is energized under normal voltage conditions, armature 50 is moved upwardly as viewed in the drawing such that contact 51 engages contacts 53 and contact 52 engages contacts 54. Closure of contacts 53 establishes a sealing circuit for maintaining energization of coil 48 subsequent to disengagement of projections 41 and 42. The sealing circuit may be traced from phase conductor 15, through coil 48, contact 51 and conductor 45 to phase conductor 16. Closure of contacts 54 conditions the circuit including coil 29 for energization when projections 41 and 42 become disengaged. As previously indicated, coil 29 cannot be energized until contacts 44 and 47 are engaged, and consequently, contactor "pumping" cannot occur during the interval projections 41 and 42 engage.

As cam 40 continues to rotate, projection 41 will be moved out of engagement with projection 42, and as a result, carrier 43 is moved downwardly so that contact 44 is first moved out of engagement with contact 46 and then into engagement with contact 47. When this occurs, the energizing circuit for coil 29 is established and this circuit may be traced from phase conductor 15 through contacts 32, conductor 30, coil 29, contact 67, conductor 64, contact 52, closed contacts 44—47, and conductor 45 to phase conductor 16. When coil 29 is energized, armature 28 is moved upwardly such that contacts 20 and 26 engage respectively contacts 21 and 27. Closure of the three sets of contacts 21 results in energization of the motor 10, and, if voltage conditions are satisfactory, the contactor 19 will remain in its picked up condition. Closure of contacts 27 establishes a sealing circuit including coil 29, a portion of which shunts contacts 44—47 for maintaining coil 29 energized during subsequent intervals when projection 41 engages projection 42 and contacts 44 and 47 are disengaged.

In the event that voltage of circuit 11 should sag for some reason to the dropout level of relay 49 after contactor 19 has been picked up, the relay 49 will drop out and its contacts 51 and 52 will be disengaged from contacts 53 and 54. Opening of contacts 54 results in interruption of the energizing circuit for coil 29 and, as a result, contactor 19 drops out and the motor 10 is deenergized. When motor 10 is deenergized, voltage of circuit 11 will rise but coil 29 cannot be reenergized until relay 49 is picked up, which cannot occur until cam 40 has rotated to again position projection 41 in engagement with projection 42. The system described, therefore, provides a so-called "one shot" motor start with undervoltage protection and wherein contactor recycling or "pumping" is eliminated. It is noted that inasmuch as the energizing circuit for coil 29 is interrupted during the period that projection 41 engages projection 42, recycling of contactor 19 cannot occur during such period. The energizing circuit for coil 29 is established immediately after disengagement of projection 41 with projection 42, and undervoltage protection is afforded by the relay 49.

If program switch 57 is employed, and switch 56 is actuated so that contacts 66—67 engage, then coil 29 can be energized only when cam 58 has rotated to position one of the recesses 63 beneath the projection 59 so as to effect closure of contacts 61—62.

Although the invention has been described with reference to certain specific embodiments thereof, numerous modifications are possible and it is intended in the attached claims to cover all modifications falling within the spirit and scope of the invention.

What I claim as new and desire to secure by Letters Patent of the United States is:

1. A protective starting system for an electric load device comprising, an electromagnetic switching device for controlling energization of the load device from a voltage source, undervoltage responsive control means operable for controlling energization of said switching device, said undervoltage control means having first and second operating conditions for normal voltage and undervoltage of said source effective respectively to permit and prevent energization of said switching device, and means for periodically and momentarily subjecting said undervoltage control means to voltage of said source, and for thereafter effecting energization of said switching device if said undervoltage control means is in said first condition.

2. A protective starting system for an electric load device comprising, an electromagnetic switching device for controlling energization of the load device from a voltage source, undervoltage responsive control means operable for controlling energization of said switching device, said undervoltage control means having first and second operating conditions for normal voltage and undervoltage of said source effective respectively to permit and prevent energization of said switching device, and second control means for controlling both said switching device and said undervoltage control means, said second control means being operable to periodically operate said undervoltage control means to establish said first operating condition if normal voltage exists, and to thereafter effect energization of said switching device, said undervoltage control means being operated from said first condition to said second condition in response to a selected undervoltage condition of said voltage source.

3. A protective starting system for an electric load device comprising, a magnetic contactor for controlling energization of the load device from a voltage source, an energizing circuit for said contactor, energizable undervoltage responsive control means effective when energized to prepare said contactor energizing circuit for energization, an energizing circuit for said control means, switch means for controlling both said contactor energizing circuit and said control means energizing circuit, said switch means being actuable to a first condition effective to interrupt the contactor energizing circuit and to establish said control means energizing circuit, and actuable to a second condition effective to complete the prepared contactor energizing circuit and to interrupt the control means energizing circuit, a sealing circuit for maintaining energization of said control means when the control means energizing circuit is interrupted, said control means being operable in response to energizations below a selected level to interrupt said contactor energizing circuit, and said sealing circuit and means operable to repeatedly actuate said switch means to said first and second conditions in alternation.

4. A protective starting system for an electric load device comprising, a magnetic contactor for controlling energization of the load device from a voltage source, an energizing circuit for said contactor, an undervoltage relay effective when energized to prepare said contactor energizing circuit for energization, an energizing circuit for said relay, switch means including a first normally closed switch in said contactor energizing circuit and a second normally open switch in said relay energizing circuit, control means operable to repeatedly actuate said first and second switches in the sequence wherein the first switch is opened, the second switch is closed, and the first and second switches are respectively closed and opened, and a sealing circuit for maintaining energization of said relay when the second switch is open, said relay being operable in response to energizations below a selected level to interrupt said contactor energizing circuit.

5. A protective starting system for an electric load device comprising, a magnetic contactor for controlling energization of the load device from a voltage source, an energizing circuit for said contactor, an undervoltage relay effective when energized to prepare said contactor energizing circuit for energization, an energizing circuit for said relay, switch means including a first normally closed switch in said contactor energizing circuit and a second normally open switch in said relay energizing circuit, control means operable to repeatedly actuate said first and second switches in the sequence wherein the first switch is opened, the second switch is closed, and the first and second switches are respectively closed and opened, and a sealing circuit for maintaining energization of said relay when the second switch is open, said relay being operable in response to energizations below a selected level to interrupt said contactor energizing circuit, said control means including a timer to be energized from said voltage source for maintaining the first switch open and the second switch closed for a time interval less than that during which the first switch is closed and the second switch is open.

6. A protective starting system for an electric load device comprising, a magnetic contactor for controlling energization of the load device from a voltage source, an energizing circuit for said contactor, an undervoltage relay effective when energized to prepare said contactor energizing circuit for energization, an energizing circuit for said relay, switch means including a first normally closed switch in said contactor energizing circuit and a second normally open switch in said relay energizing circuit, control means operable to repeatedly actuate said first and second switches in the sequence wherein the first switch is opened, the second switch is closed, and the first and second switches are respectively closed and opened, and a sealing circuit for maintaining energization of said relay when the second switch is open, said relay being operable in response to energizations below a selected level to interrupt said contactor energizing circuit, said contactor including normally open contacts shunting said first switch, said normally open contacts being closed in response to completion of said contactor energizing circuit to maintain such completion during intervals when said first switch is open.

7. A protective starting system for an electric load device comprising, a magnetic contactor for controlling energization of the load device from a voltage source, an energizing circuit for said contactor, an undervoltage relay effective when energized to prepare said contactor energizing circuit for energization, an energizing circuit for said relay, switch means including a first normally closed switch in said contactor energizing circuit and a second normally open switch in said relay energizing circuit, control means operable to repeatedly actuate said first and second switches in the sequence wherein the first switch is opened, the second switch is closed, and the first and second switches are respectively closed and opened, and a sealing circuit for maintaining energization of said relay when the second switch is open, said relay being operable in response to energizations below a selected level to interrupt said contactor energizing circuit, said control means comprising a timer to be energized from said voltage source for maintaining the first switch open and the second switch closed for a time interval less than that during which the first switch is closed and the second switch is open, said contactor including normally open contacts shunting said first switch, said normally open contacts being closed in response to completion of said contactor energizing circuit to maintain such completion during intervals when said first switch is open.

8. A protective starting system for an electric load device comprising, a magnetic contactor having normally open contacts in circuit with said load device, and a coil energization to close said contacts, undervoltage relay means including first normally open contacts in circuit with said contactor coil, second normally open contacts, and a coil energizable to close said first and second normally open contacts, a sealing circuit for the relay coil including said second contacts, switch means including a first normally closed switch in circuit with said contactor coil and a second normally open switch in circuit with said relay coil, and control means operable for actuating said switch means to initially open said normally closed switch, and to thereafter close said normally open switch for energizing said relay coil to close said relay contacts, said control means being additionally operable subsequent to energization of said relay coil to close said normally closed switch to energize the contactor coil and to open the normally open switch, said relay being operable to open its normally open contacts in response to energizations below a selected level to deenergize the contactor coil whereby the relay coil and contactor coil remain deenergized until the control means again operates said switch means to close said normally open switch.

9. A protective system for energizing a plurality of electric load devices from a common source of voltage comprising, a plurality of control circuits each including a magnetic contactor having contacts in circuit with one of said load devices, said contacts being closed in response to energization of the contactor, an energizing circuit for the contactor, undervoltage relay means effective when energized to prepare said contactor energizing circuit for energization, an energizing circuit for said relay means, switch means for controlling both said contactor energizing circuit and said relay energizing circuit, said switch means being actuable to a first condition effective to interrupt the contactor energizing circuit and to establish said relay energizing circuit, and actuable to a second condition effective to complete the prepared contactor energizing circuit and to interrupt the relay energizing circuit, a sealing circuit for maintaining energization of said relay means when the relay energizing circuit is interrupted, said relay means being operable in response to energizations below a selected level to interrupt said contactor energizing circuit, and means operable to repeatedly actuate said switch means to said first and second conditions in alternation.

10. A protective system for energizing a plurality of electric load devices from a common source of voltage comprising, a plurality of control circuits each including a magnetic contactor having contacts in circuit with one of said load devices, said contacts being closed in response to energization of the contactor, an energizing circuit for the contactor, undervoltage relay means effective when energized to prepare said contactor energizing circuit for energization, an energizing circuit for said relay means, switch means for controlling both said contactor energizing circuit and said relay energizing circuit, said switch means being actuable to a first condition effective to interrupt the contactor energizing circuit and to establish said relay energizing circuit, and actuable to a second condition effective to complete the prepared contactor energizing circuit and to interrupt the relay energizing circuit, a sealing circuit for maintaining energization of said relay means when the relay energizing circuit is interrupted, said relay means being operable in response to energizations below a selected level to interrupt said contactor energizing circuit, and control means operable to repeatedly actuate said switch means to said first and second conditions in alternation, said control means including a timer to be energized from said voltage source for maintaining the first switch condition for a time interval less than that during which the second switch condition is maintained.

11. A protective system for energizing a plurality of electric load devices from a common source of voltage comprising, a plurality of control circuits each including a magnetic contactor having contacts in circuit with one of said load devices, said contacts being closed in response to energization of the contactor, an energizing circuit for the contactor, undervoltage relay means effective when energized to prepare said contactor energizing circuit for energization, an energizing circuit for said relay means, switch means for controlling both said contactor energizing circuit and said relay energizing circuit, said switch means being actuable to a first condition effective to interrupt the contactor energizing circuit and to establish said relay energizing circuit, and actuable to a second condition effective to complete the prepared contactor energizing circuit and to interrupt the relay energizing circuit, a sealing circuit for maintaining energization of said relay means when the relay energizing circuit is interrupted, said relay means being operable in response to energizations below a selected level to interrupt said contactor energizing circuit, and control means operable to repeatedly actuate said switch means to said first and second conditions in alternation, said control means including a timer to be energized from said voltage source for maintaining the first switch condition for a time interval less than that during which the second switch condition is maintained, and a program switch included in said contactor energizing circuit.

References Cited in the file of this patent

UNITED STATES PATENTS

| | | |
|---|---|---|
| 1,855,735 | Wensley | Apr. 26, 1932 |
| 2,216,598 | Minneci | Oct. 1, 1940 |
| 2,259,965 | Taliaferro | Oct. 21, 1941 |
| 2,977,511 | Reeder | Mar. 28, 1961 |